United States Patent
Hirayanagi et al.

[11] Patent Number: 5,890,572
[45] Date of Patent: Apr. 6, 1999

[54] LOCKUP CLUTCH FOR TORQUE CONVERTER

[75] Inventors: Tsuyoshi Hirayanagi; Shigeki Umezawa, both of Shizuoka, Japan

[73] Assignee: NSK-Warner Kabushiki Kaisha, Tokyo, Japan

[21] Appl. No.: 735,342

[22] Filed: Oct. 22, 1996

[30] Foreign Application Priority Data

Oct. 26, 1995 [JP] Japan .................................. 7-300466

[51] Int. Cl.$^6$ .......................... F16H 45/02; F16D 69/00
[52] U.S. Cl. ..................................... 192/3.29; 192/113.3
[58] Field of Search .......................... 192/3.29, 3.28, 192/113.34, 113.35, 113.36, 107 R, 107 M, 113.3, 113.31

[56] References Cited

U.S. PATENT DOCUMENTS

| | | | |
|---|---|---|---|
| 2,856,050 | 10/1958 | Mathews | 192/113.36 |
| 4,969,543 | 11/1990 | Macdonald | 192/113.36 X |
| 5,248,016 | 9/1993 | Umezawa | 192/3.28 |
| 5,456,343 | 10/1995 | Murata et al. | 192/3.29 |
| 5,605,210 | 2/1997 | Koike et al. | 192/3.29 |

FOREIGN PATENT DOCUMENTS 6-346951  12/1994  Japan .

*Primary Examiner*—Rodney H. Bonck
*Attorney, Agent, or Firm*—Sughrue, Mion, Zinn, Macpeak & Seas, PLLC

[57] ABSTRACT

The invention includes a decompression board 35 bonded on a piston 1, and bonds a friction member 40 on a surface of the decompression board, wherein an oil groove is formed on the decompression board.

17 Claims, 7 Drawing Sheets

LOCKUP CLUTCH FOR TORQUE CONVERTER

BACKGROUND OF THE INVENTION

1. Field of the invention

The invention relates to a lockup clutch for a torque converter.

2. Description of the Related Art

Figure 14:
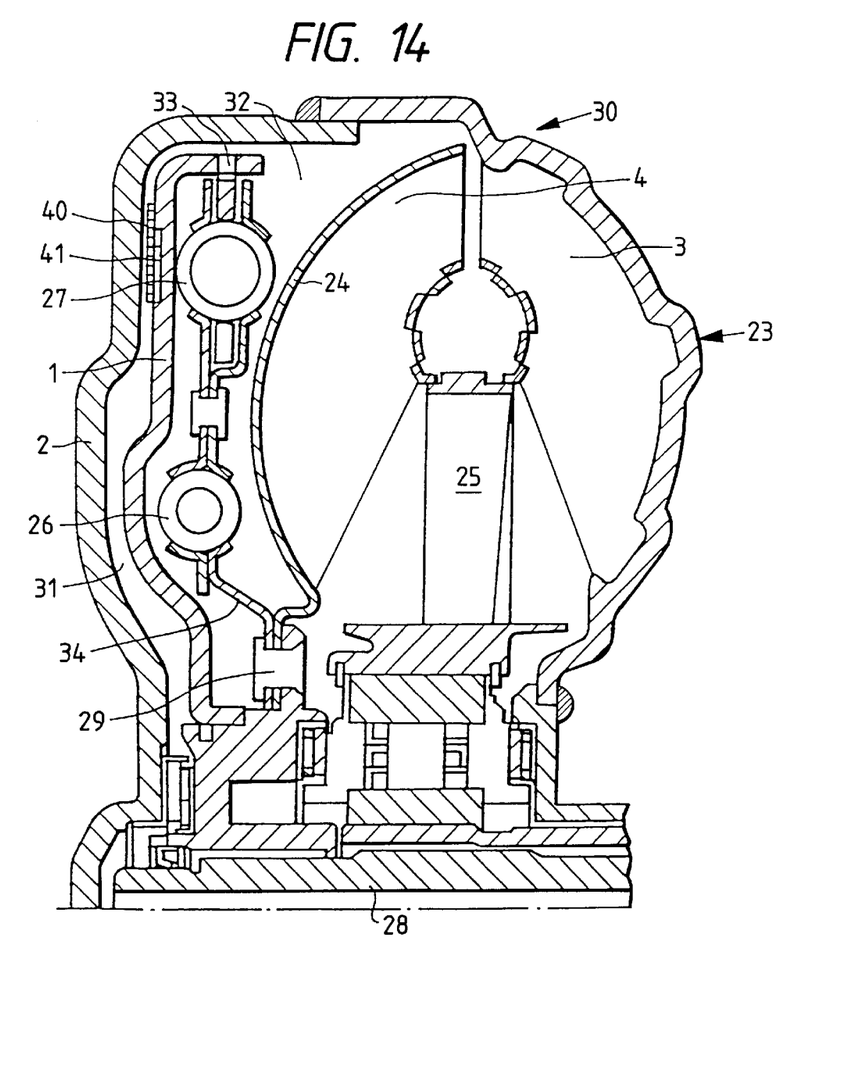
FIG. 14 is a view explaining a torque converter with a lockup clutch.

FIG. 14 shows a structure of a torque converter 30 with a lockup clutch. In this drawing, numeral 2 represents a front cover connected directly with a shaft of a machine; 23, a pump case fixed to the front cover 2; 3, a pump; 4, a turbine; 24, a turbine case; 25, a stator; and 28, an output shaft connected directly with the turbine case 24.

The torque converter is a fluid coupling which is a combination of the pump and the turbine. Slip exists even if the rotation of the pump substantially coincides with the turbine. Accordingly, the transmission efficiency of the torque converter is lower than that of a directly connected mechanical clutch.

Therefore, a torque converter with a lockup clutch, a mechanical clutch has been utilized. In FIG. 14, numeral 1 represents a piston; 26, 27, springs for a damper; 34, a driven disk; 29, a direct-connected part with the turbine case 24; 31, a first oil chamber; 32, a second oil chamber; 40, a friction member bonded on the piston 1; and 41, an oil groove formed on the piston 1. As a pressure of the second oil chamber 32 is made higher, the piston 1 is compressedly contacted to the front cover 2 through the friction member 40, and the piston 1 rotates together with the front cover 2. The rotation is transmitted to the driven disk 34 through a connecting part 33 of a spline or the like, and then the rotation is transmitted to the output shaft 28, by the direct-connected part 29.

In such a lockup clutch, high pressure oil from the second oil chamber 32 penetrates into the friction member during operation. Consequently, the high pressure oil becomes a reaction force opposing a force which presses the piston 1, thereby decreasing torque transmission capacity. Therefore, for example, as shown in FIG. 14, the oil groove 41 is formed on the piston 1 so that the high pressure oil penetrating into the friction member during operation immediately flows into the first oil chamber 31 from the oil groove 41.

In the conventional clutch mechanism, since the oil groove is formed directly on a press surface of the clutch, namely either, the friction member, the front cover, the piston or the like, the strength of the part on which the oil groove is located decreases.

In the processing of the oil groove, cutting work that must be done on a hard material to form the groove is difficult. Also, cutting has the problem of increasing the production cost because workability of the hard material is so bad that it takes a long time to complete. When the oil groove is formed by molding, the life of the die is short because the die is narrow. On the other hand, when the oil groove is formed by cutting, the material into which the groove is cut is weakened thus and the life of the part is reduced. In addition, since the piston is heat treated during molding, cutting it thereafter to form the oil groove lengthens the manufacturing time required. Moreover, the piston to which quenching treatment is applied has a very hard surface where the oil groove formed. Accordingly such a piston is should not be cut to form the oil groove.

SUMMARY OF THE INVENTION

The object of the present invention is to provide a lockup clutch for a torque converter having an oil groove capable of removing a high pressure oil, which oppose the force that presses the parts of the clutch into engagement without weakening the parts.

The lockup clutch of the invention has a friction member bonded on either a surface of a clutch piston of the lockup clutch for the torque converter, or a surface in opposition thereto. The friction member is porous and a decompression board is put between the bonding-surface of the friction member and the surface to which the friction member is to be bonded. The decompression board is annular-shaped and non-porous. The decompression board has an oil groove on the surface thereof which is bonded to the friction member. Alternatively the decompression board has a slit-shaped oil groove which goes therethrough from one surface to a back surface thereof.

In the present invention, the oil groove is formed on the decompression board so as to prevent the reduction in strength of the piston, the front cover, and the friction member or the like. In addition, forming the oil groove by cutting is preferable for strength. However, to form the slit-shaped oil groove by stamping is good for workability.

DETAILED DESCRIPTION OF THE PREFERRED EMBODIMENTS

Figure 1A:
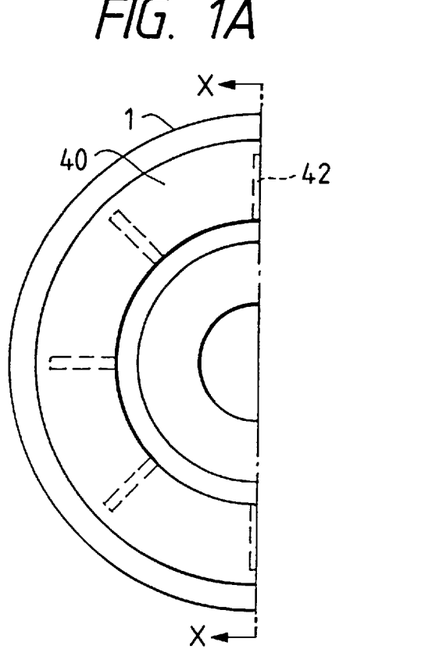
FIG. 1A and 1B are views showing a first embodiment of the invention.
Figure 1B:
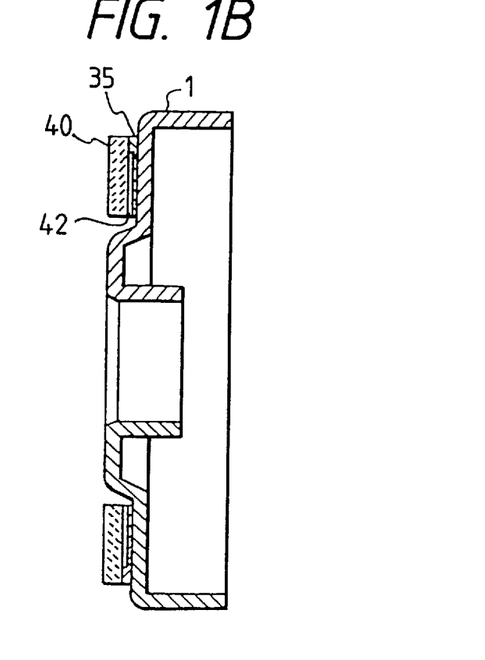

FIG. 1A is a front view showing a first embodiment of the invention, and FIG. 1B is a sectional view taken along a line X—X of FIG. 1A. A decompression board 35 is an annular-shaped and non-porous. The decompression board 35 is bonded on a surface of a piston 1. A friction member 40 is an annular-shaped and porous. The friction member 40 is bonded on a surface of the decompression board 35. An oil groove 42 is formed on the decompression board 35 and formed in the radial direction thereof.

Figure 2A:
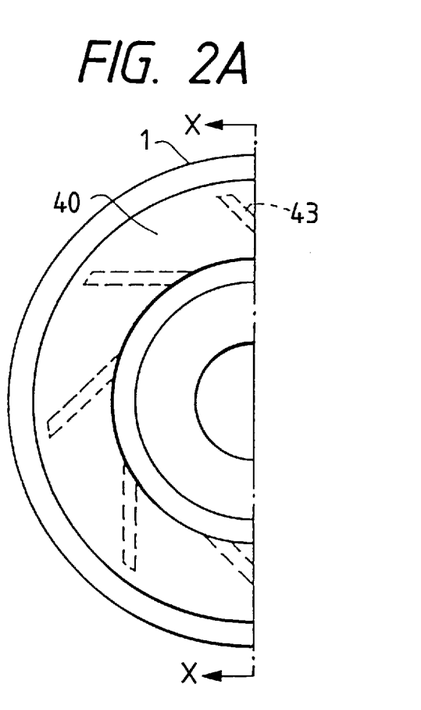
FIG. 2A and 2B are views showing a second embodiment of the invention.
Figure 2B:
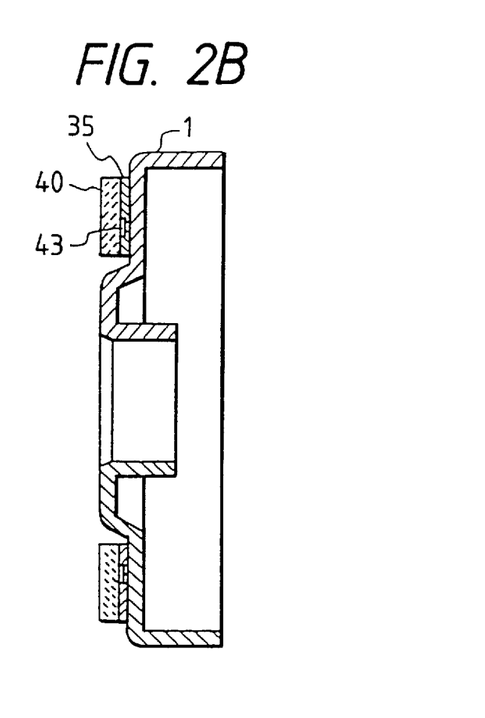

FIG. 2A is a front view showing a second embodiment of the invention, and FIG. 2B is a sectional view taken along a line X—X of FIG. 2A. An oil groove 43 is formed on the decompression board 40, and the oil groove 43 is formed obliquely with respect to the radial direction of the decompression board 35 in comparison with the first embodiment.

Figure 3A:
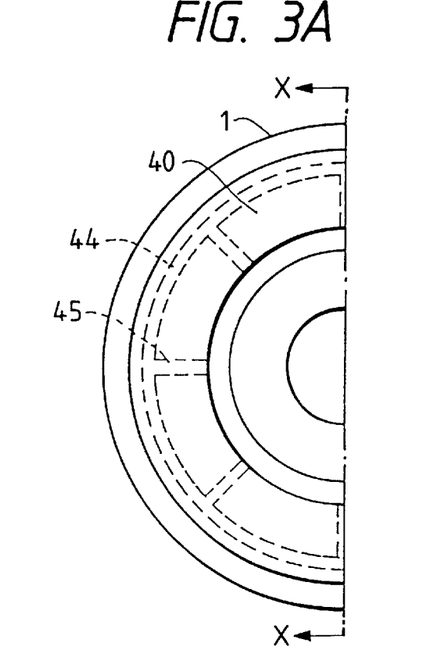
FIG. 3A and 3B are views showing a third embodiment of the invention.
Figure 3B:
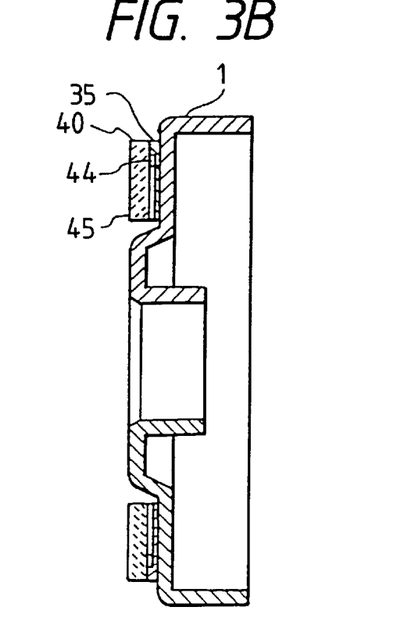

FIG. 3A is a front view showing a third embodiment of the invention, and FIG. 3B is a sectional view taken along a line X—X of FIG. 3A. An oil groove of the third embodiment has a circumferential portion 44 and a radial portion 45.

Figure 4A:
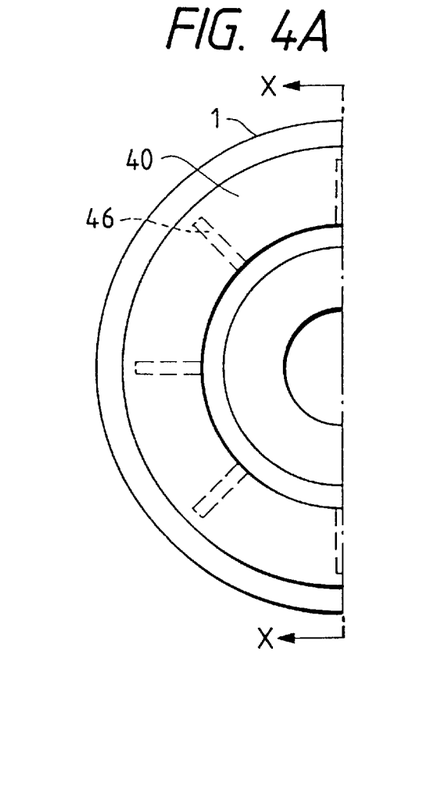
FIG. 4A and 4B are views showing a fourth embodiment of the invention.
Figure 4B:
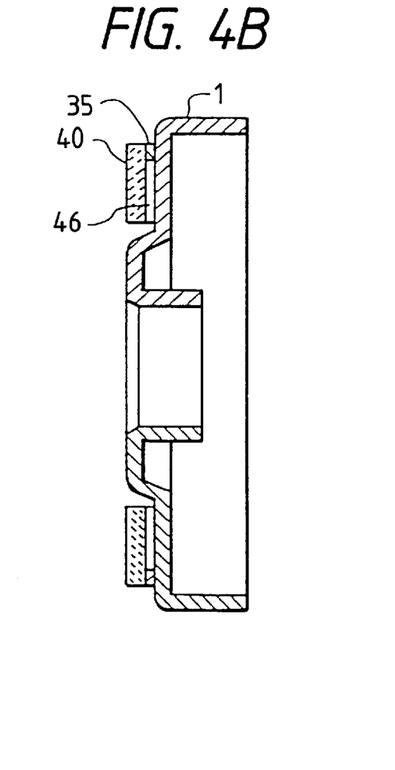

FIG. 4A is a front view showing a fourth embodiment of the invention, and FIG. 4B is a sectional view taken along a line X—X of FIG. 4A. An oil groove 46 is formed in a slit-shape so as to go through the decompression board 35 from the front to the back.

Figure 5A:
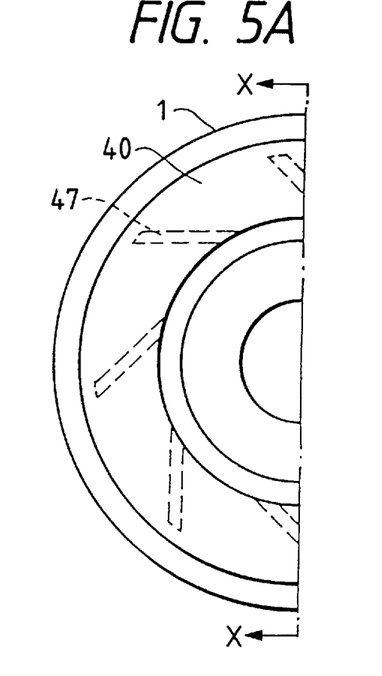
FIG. 5A and 5B are views showing a fifth embodiment of the invention.
Figure 5B:
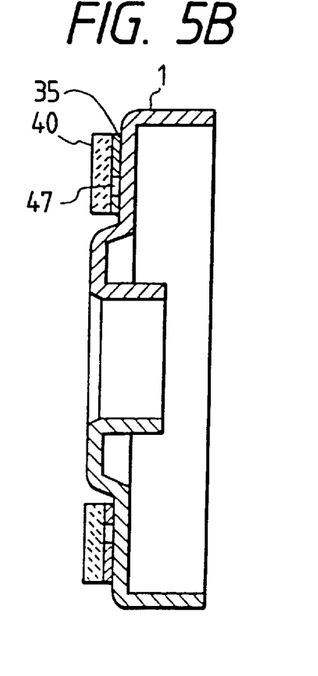

FIG. 5A is a front view showing a fifth embodiment of the invention, and FIG. 5B is a sectional view taken along a line X—X of FIG. 5A. An oil groove 47 is formed obliquely with respect to the radial direction of the decompression board 35 and is formed in a slit-shape to go through the decompression board 35 from the front to the back.

Figure 6A:
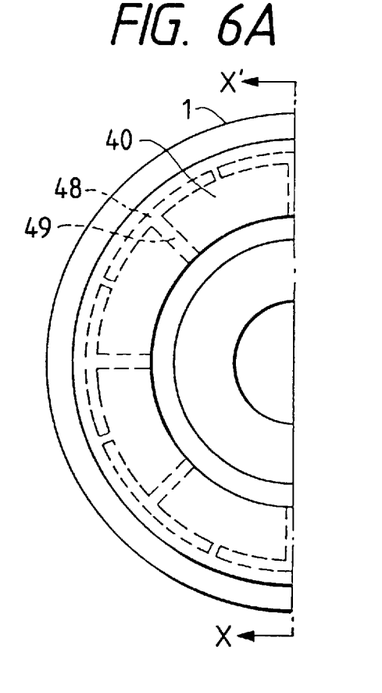
FIG. 6A and 6B are views showing a sixth embodiment of the invention.
Figure 6B:
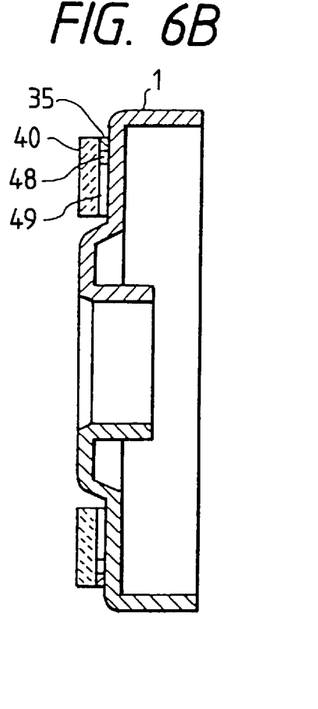

FIG. 6A is a front view showing a sixth embodiment of the invention, and FIG. 6B is a sectional view taken along a line X—X of FIG. 6A. A slit-shaped oil groove of the sixth embodiment has a circumferential portion 48 which is broken in several places and a radial portion 49.

Figure 7A:
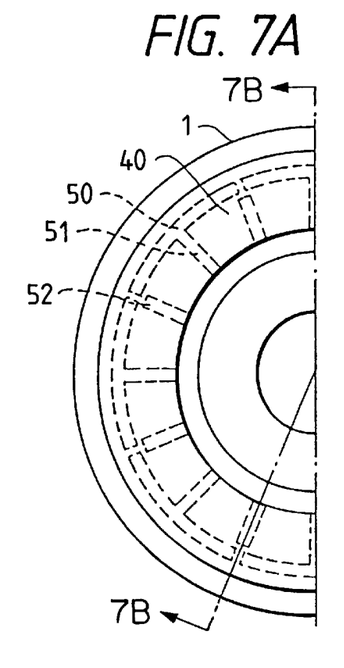
FIG. 7A and 7B are views showing a seventh embodiment of the invention.
Figure 7B:
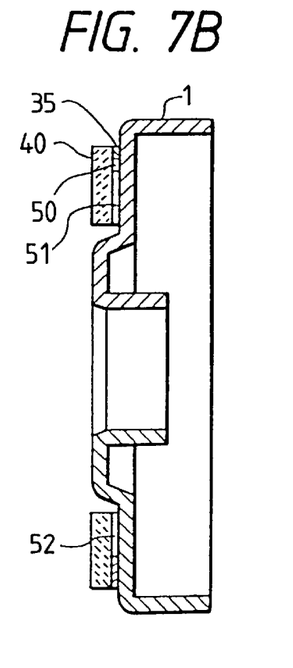

FIG. 7A is a front view showing a seventh embodiment of the invention, and FIG. 7B is a sectional view taken along a line A—A of FIG. 7A. A slit-shaped oil groove of the seventh embodiment has a circumferential portion 50 which is broken in several places, a first radial portion 51 and a second radial portion 52. The first radial portion 51 is connected with the circumferential portion 50 and the second portion 52 is not connected thereto.

Figure 8A:
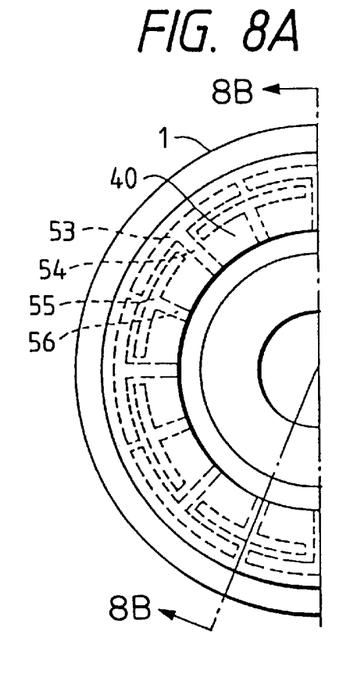
FIG. 8A and 8B are views showing a eighth embodiment of the invention.
Figure 8B:
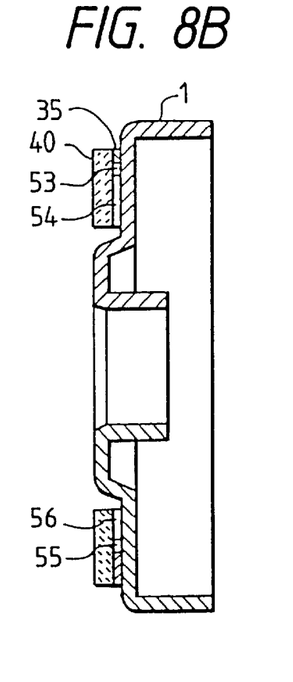

FIG. 8A is a front view showing an eighth embodiment of the invention, and FIG. 8B is a sectional view taken along a line B—B of FIG. 8A. A slit-shaped oil groove of the eighth embodiment going through the decompression board 35 has an outer circumferential portion 53 which is broken in several places, a first radial portion 54 which is connected with the outer circumferential portion 53, an inner circumferential portion 55 which is inside of the first radial portion 54 and is broken in several places, and a second radial portion 56 which is connected with the inner circumferential portion 55.

Figure 9A:
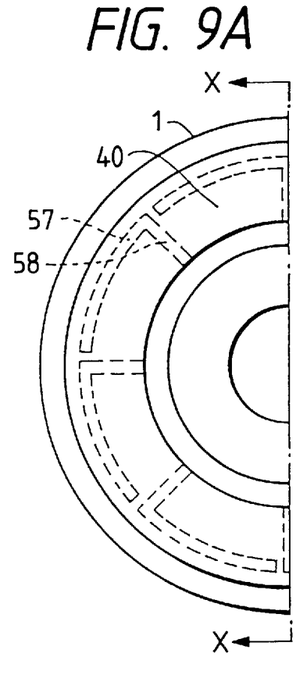
FIG. 9A and 9B are views showing a ninth embodiment of the invention.
Figure 9B:
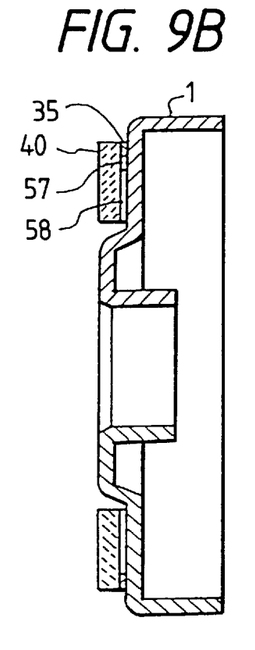

FIG. 9A is a front view showing a ninth embodiment of the invention, and FIG. 9B is a sectional view taken along a line X—X of FIG. 9A. A slit-shaped oil groove of the ninth embodiment has a circumferential portion 57 and a radial portion 58. It is different from the sixth embodiment that the radial portion 58 extends from one end of the circumferential portion 57.

Figure 10A:
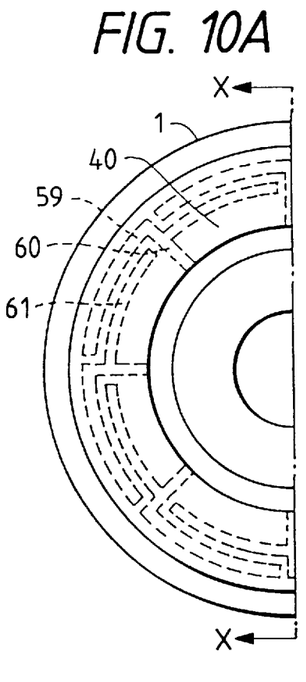
FIG. 10A and 10B are views showing a tenth embodiment of the invention.
Figure 10B:
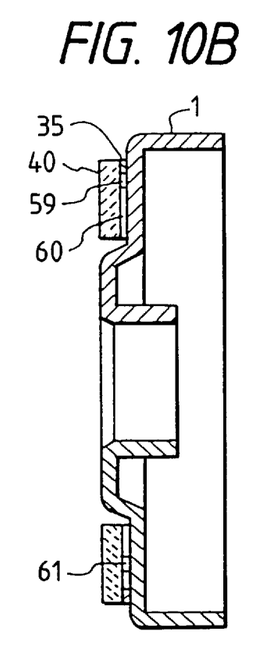

FIG. 10A is a front view showing a tenth embodiment of the invention, and FIG. 10B is a sectional view taken along a line X—X of FIG. 10A. A slit-shaped oil groove of the tenth embodiment has an outer circumferential portion 59, an inner circumferential portion 61 and a radial portion 60. It is different from the eighth embodiment in that the radial portion 60 extends from one end of the outer circumferential portion 59 and connects with the side end of the inner circumferential portion 61.

Figure 11A:
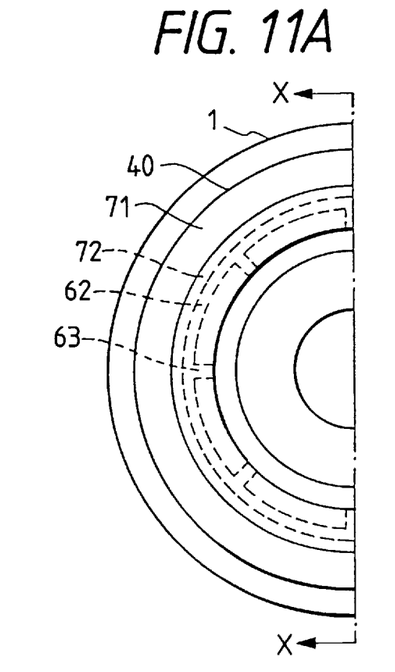
FIG. 11A and 11B are views showing a eleventh embodiment of the invention.
Figure 11B:
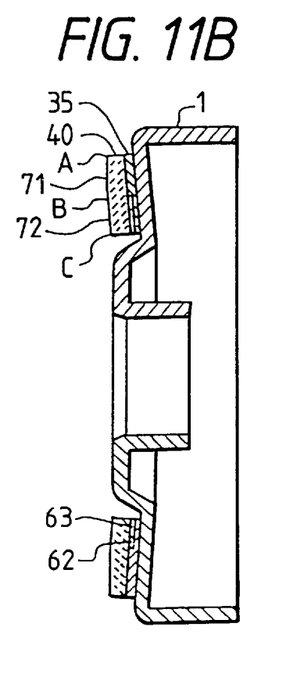
Figure 12A:
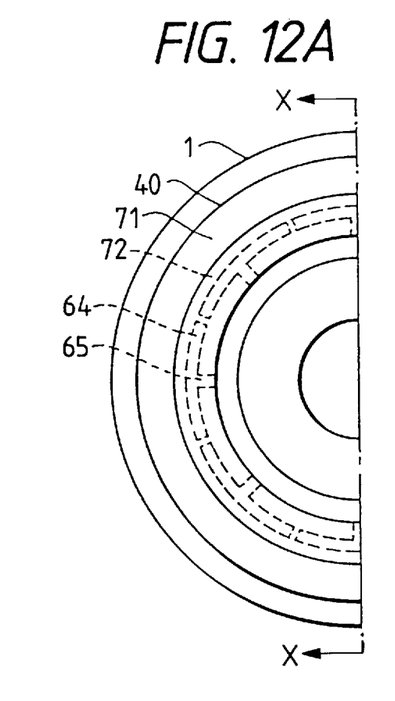
FIG. 12A and 12B are views showing a twelfth embodiment of the invention.
Figure 12B:
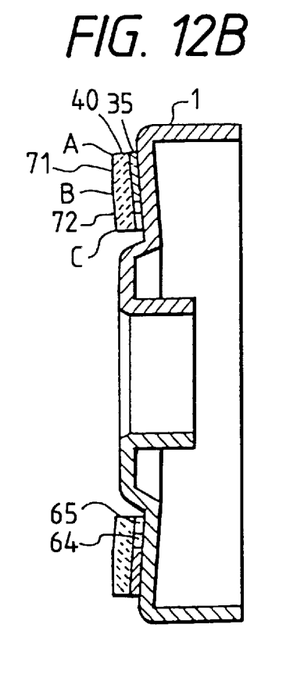

An eleventh embodiment as shown in FIG. 11A and 11B, and a twelfth embodiment as shown in FIG. 12A and 12B use a friction member 40 on which cutting work has been performed on the outer radial part thereof.

FIG. 11A is a front view showing the eleventh embodiment of the invention, and FIG. 11B is a sectional view taken along a line X—X of FIG. 11A. The decompression board 35 is bonded on the piston 1. The friction member 40 is bonded on the decompression board 35. The section between an outer circumferential end A and a point B of the friction member 40 is cut. A point C is an inner circumferential end of the friction member 40. Namely, a surface 71 between A and B is a flat portion formed by cutting and a surface 72 between B and C is a inclined portion that has not been cut. An oil groove of the eleventh embodiment has a circumferential portion 62 and a radial portion 63. The radial portion 63 of the oil groove extends from the inner circumferential end C to just front of the point B.

FIG. 12A is a front view showing the twelfth embodiment of the invention, and FIG. 12B is a sectional view taken along a line X—X of FIG. 12A. It is different from the eleventh embodiment in that both a circumferential oil groove 64 and a radial oil groove 65 are slit-shaped oil grooves which go through the decompression board 35 from the face to the back. The radial oil groove 65 extends from the inner circumferential end C to the inside of the point B.

Figure 13:
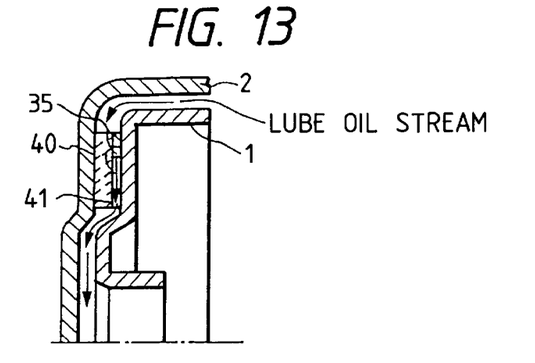
FIG. 13 is a view showing a lube oil stream of a clutch of the invention.

FIG. 13 shows a stream of lube oil at the time of the engagement of a clutch according to the present invention. First, the decompression board 35 is bonded on the piston 1, and the friction member 40 is bonded on the surface of the decompression board 35. Second, as a pressure of a second oil chamber 32 is made higher, the piston 1 is pushed toward left and is pressed to a front cover 2. As shown by an arrow, although the high pressure oil enters from the second oil chamber 32 to the friction member 40, the high pressure oil enters to an oil groove 41 of the decompression board 35 and passes to a first oil chamber 31. Therefore, the high pressure oil does not harm torque transmission capacity by pressure of the oil becoming a reaction force of a force pushing the clutch. Further, since the oil groove 41 is formed in the decompression board, the strength of the piston 1 or the like is not decreased.

In each embodiment as stated above, the friction member is mounted on only the one side of the piston 1. However, the present invention is applied to the lockup clutch which the friction member is formed on the both sides of the piston 1 or the lockup clutch forming several friction members.

What is claimed is:

1. A lockup clutch for a torque converter comprising:
   a cover countermember;
   a clutch piston having a first surface facing said cover countermember;
   a friction member for bonding on either said first surface of said clutch piston or an inside surface of said cover countermember which faces said clutch piston first surface, wherein said friction member is porous; and
   a decompression board having a front surface bonded to said friction member and a back surface bonded to either said first surface of said clutch piston or said inside surface of said cover countermember, wherein said decompression board is non-porous and only said decompression board includes an oil groove.

2. A lockup clutch for a torque converter according to claim 1, wherein said oil groove has a radial portion extending in a radial direction of said decompression board.

3. A lockup clutch for a torque converter according to claim 1, wherein said oil groove has a portion extending obliquely with respect to the radial direction of said decompression board.

4. A lockup clutch for a torque converter according to claim 1, wherein said oil groove has a circumferential portion extending in a circumferential direction of said decompression board and a radial portion extending in a radial direction of said decompression board.

5. A lockup clutch for a torque converter according to claim 4, wherein said circumferential portion is connected with one end of said radial portion.

6. A lockup clutch for a torque converter according to claim 1, where said oil groove is formed as a slit shape which goes through said decompression board from said front surface to said back surface thereof.

7. A lockup clutch for a torque converter according to claim 6, wherein said oil groove has a radial portion extending in a radial direction of said decompression board.

8. A lockup clutch for a torque converter according to claim 6, wherein said oil groove has a portion extending obliquely with respect to the radial direction of said decompression board.

9. A lockup clutch for a torque converter according to claim 6, wherein said oil groove has a first circumferential portion which extends in a circumferential direction of said decompression board and is broken in a plurality of places so as to define a plurality of arcuate portions, and a first radial portion extending in a radial direction of said decompression board.

10. A lockup clutch for a torque converter according to claim 9, wherein one arcuate portion of said first circumferential portion is connected with one end of said first radial portion.

11. A lockup clutch for a torque converter according to claim 10, wherein said oil groove has a second radial portion extending in a radial direction of said decompression boards, wherein said second radial portion is not connected to said first circumferential portion.

12. A lockup clutch for a torque converter according to claim 10, wherein said oil groove has a second circumferential portion extending in a circumferential direction of said decompression board and a second radial portion which extends in a radial direction of said decompression board and is connected with said second circumferential portion, said second circumferential portion and said second radial portion being formed inside of said first circumferential portion.

13. A lockup clutch for a torque converter according to claim 10, wherein one end of said first radial portion is connected with one end of one arcuate portion of said first circumferential portion.

14. A lockup clutch for a torque converter according to claim 13, wherein said first radial portion has a second circumferential portion extending therefrom in the circumferential direction, said second circumferential portion being connected with said first radial portion at a point inside said first circumferential portion.

15. A lockup clutch for a torque converter according to claim 14, wherein said one arcuate portion of said first circumferential portion and said second circumferential portions extend from opposite sides of said first radial portion.

16. A lockup clutch for a torque converter according to claim 1, wherein said friction member is annular and includes a first surface and a second surface opposite to said first surface, wherein said second surface is bonded to said decompression member and said first surface includes a cut portion defined between the outer most circumferential edge of said friction member and a circumference between the outermost circumferential and innermost circumferential edges of said friction member, and said oil groove extends from an inner circumferential portion of said decompression board to just inside said circumference between the outermost circumferential and innermost circumferential edges of said friction member.

17. A lockup clutch for a torque converter according to claim 16, wherein said oil groove is a slit shape which extends through the decompression board from said front surface to said back surface.

* * * * *